US010039132B2

(12) United States Patent
Lee et al.

(10) Patent No.: US 10,039,132 B2
(45) Date of Patent: Jul. 31, 2018

(54) METHOD AND APPARATUS FOR RECEIVING RANDOM ACCESS RESPONSE FOR MTC UE

(71) Applicant: KT CORPORATION, Gyeonggi-do (KR)

(72) Inventors: KyungJun Lee, Seoul (KR); Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 70 days.

(21) Appl. No.: 15/260,415

(22) Filed: Sep. 9, 2016

(65) Prior Publication Data

US 2017/0094688 A1 Mar. 30, 2017

(30) Foreign Application Priority Data

Sep. 24, 2015 (KR) .................. 10-2015-0135772
Aug. 12, 2016 (KR) .................. 10-2016-0102774

(51) Int. Cl.
*H04W 4/00* (2018.01)
*H04J 3/00* (2006.01)
*H04W 74/08* (2009.01)
*H04W 48/12* (2009.01)
*H04W 4/70* (2018.01)
*H04W 88/02* (2009.01)

(52) U.S. Cl.
CPC ......... *H04W 74/0833* (2013.01); *H04W 4/70* (2018.02); *H04W 48/12* (2013.01); *H04W 88/02* (2013.01)

(58) Field of Classification Search
CPC .. H04W 74/0833; H04W 4/005; H04W 88/02
See application file for complete search history.

(56) References Cited

U.S. PATENT DOCUMENTS 9,854,609 B2 * 12/2017 Yang ................. H04W 74/0833
2011/0045837 A1 2/2011 Kim et al.
2015/0124746 A1 * 5/2015 Wu ................... H04W 74/0833
370/329

FOREIGN PATENT DOCUMENTS

KR 10-2011-0020170 A 3/2011
WO 2014/019436 A1 2/2014

* cited by examiner

*Primary Examiner* — Kiet Tang
(74) *Attorney, Agent, or Firm* — IP Legal Services, LLC

(57) ABSTRACT

The present disclosure relates to a downlink data transmission/reception technique for supporting a low-complexity UE category/type for a MTC operation. A method may be provided for an MTC UE to receive a random access response. The method may include: repeatedly transmitting a random access preamble to a base station through a Physical Random Access Channel (PRACH) of at least one subframe; determining a Random Access Radio Network Temporary Identifier (RA-RNTI) using first time index information, frequency index information, and second time index information on the PRACH; and receiving a random access response to the random access preamble using the RA-RNTI within a random access response window.

12 Claims, 16 Drawing Sheets

*FIG.8*

| E | T | RAPID | Oct 1

*FIG.9*

| E | T | R | R | BI | | Oct 1

METHOD AND APPARATUS FOR RECEIVING RANDOM ACCESS RESPONSE FOR MTC UE

CROSS REFERENCE TO RELATED APPLICATION

This application claims priority from Korean Patent Application No. 10-2015-0135772 & 10-2016-0102774, filed on Sep. 24, 2015 & Aug. 12, 2016, which is hereby incorporated by reference for all purposes as if fully set forth herein.

BACKGROUND OF THE INVENTION

1. Field of the Invention

The present disclosure relates to a downlink data transmission/reception technique for supporting a low-complexity User Equipment (UE) category/type for a Machine-Type Communication (MTC) operation, and more particularly to a technique for an MTC UE to transmit and receive a random access response.

2. Description of the Prior Art

Machine-Type Communication (hereinafter, referred to as "MTC") is a type of data communication, which refers to device-to-device or machine-to-machine communication in which one or more entities do not necessarily involve human interaction. MTC involving no human interaction refers to any mode of communication that is achieved without human intervention in a communication process.

An MTC User Equipment (UE) may be installed in a place with a poor propagation environment as compared with a typical UE. In order for the MTC UE to operate in the poor propagation environment as compared with that for the typical UE, the MTC UE may need to repeatedly transmit control information and/or data on each physical channel, which is transmitted via only one subframe unit, via a plurality of subframes.

Further, the MTC UE may be restricted in using radio resources. That is, the MTC UE may be set to use only some frequency resources or some time resources.

As described above, the MTC UE is different from the legacy typical UE in the methods of transmitting and receiving data, and such a difference may make it difficult to achieve a random access procedure between the MTC UE and a base station. For example, due to repeated transmissions by the MTC UE, there is a possibility that the base station is restricted to process a very limited number of random access responses. Further, when the base station transmits random access responses to a plurality of MTC UEs, collision is increasingly likely to occur due to repeated transmissions.

Due to the foregoing problems, an initial random access procedure between the MTC UE and the base station may not be properly achieved.

SUMMARY OF THE INVENTION

In this background, an aspect of the present disclosure is to provide a method and an apparatus for enabling a base station to properly convey random access responses to a plurality of Machine-Type Communication (MTC) User Equipments (UEs) even when repeatedly transmitting the RARs.

Further, an aspect of the present disclosure is to provide a method and an apparatus for preventing an error from being generated by collision between RARs within an RAR window in a random access procedure.

In accordance with an aspect of the present disclosure, there is provided a method for an MTC UE to receive an RAR. The method may include: repeatedly transmitting a random access preamble to a base station through a Physical Random Access Channel (PRACH) of at least one subframe; determining a Random Access Radio Network Temporary Identifier (RA-RNTI) using first time index information, frequency index information, and second time index information on the PRACH; and receiving an RAR to the RAP using the RA-RNTI within an RAR window.

In accordance with another aspect of the present disclosure, there is provided a method for a base station to transmit an RAR to an MTC UE. The method includes: repeatedly receiving an RAP from the MTC UE through a PRACH of at least one subframe; determining an RA-RNTI using first time index information, frequency index information, and second time index information on the PRACH; and transmitting an RAR to the RAP using the RA-RNTI within an RAR window.

In accordance with still another aspect of the present disclosure, there is provided an MTC UE for receiving an RAR. The MTC UE may include a transmitter, a controller, and a receiver. The transmitter may be configured to repeatedly transmit an RAP to a base station through a PRACH of at least one subframe. The controller may be configured to determine an RA-RNTI using first time index information, frequency index information, and second time index information on the PRACH. The receiver may be configured to receive an RAR to the RAP using the RA-RNTI within an RAR window.

In accordance with yet another aspect of the present disclosure, there is provided a base station for transmitting an RAR to an MTC UE. The base station may include a receiver, a controller, and a transmitter. The receiver may be configured to repeatedly receive an RAP from the MTC UE through a PRACH of at least one subframe. The controller may be configured to determine an RA-RNTI using first time index information, frequency index information, and second time index information on the PRACH. The transmitter may be configured to transmit an RAR to the RAP using the RA-RNTI within an RAR window.

As described above, according to at least one embodiment, a base station may properly convey RARs to a plurality of MTC UEs even when repeatedly transmitting the RARs Further, according to at least one embodiment, it may prevent an error from being generated by collision between RARs within an RAR window in a random access procedure

BRIEF DESCRIPTION OF THE DRAWINGS

The above and other objects, features, and advantages of the present invention will be more apparent from the following detailed description taken in conjunction with the accompanying drawings, in which:

FIG. 8 is a diagram illustrating an E/T/RAPID MAC subheader.

FIG. 9 is a diagram illustrating an E/T/R/R/BI MAC subheader.

DETAILED DESCRIPTION OF THE EXEMPLARY EMBODIMENTS

Figure 1:
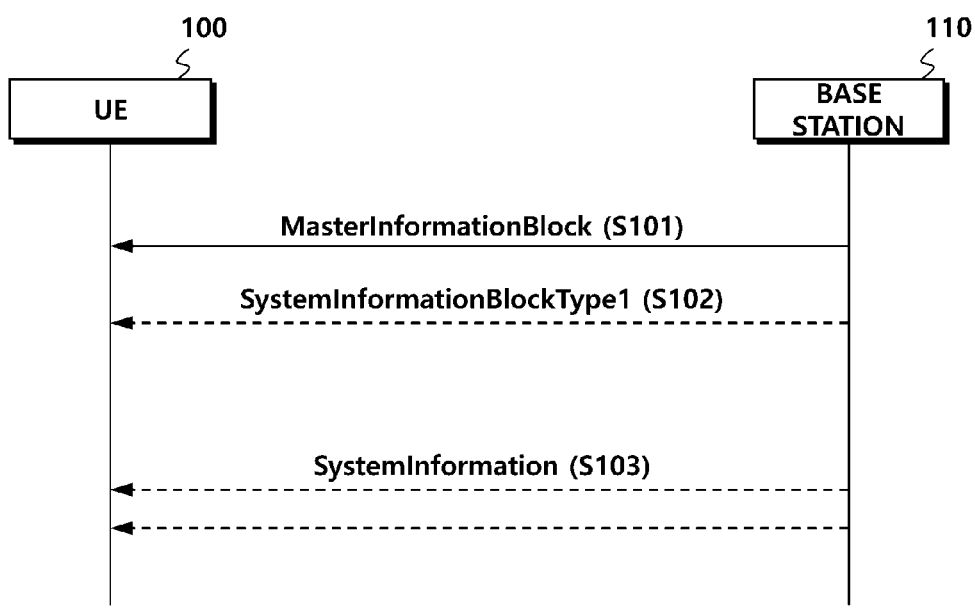
FIG. 1 is a signal diagram illustrating an operation of transmitting system information.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In the present specifications, a machine type communication (MTC) terminal refers to a low cost or low complexity terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined third generation partnership project (3GPP) Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a mega cell, a macro cell, a micro cell, a pico cell, a femto cell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an radio remote head (RRH), an antenna, an radio unit (RU), a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a mega cell, a macro cell, a micro cell, a pico cell, a femto cell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

According to a transmission and reception method for downlink radio signals and radio channels between a base station and a User Equipment (UE) defined in a typical 3GPP LTE/LTE-Advanced system, a random Radio Resource Control (RRC)-connected UE may monitor a Common Search Space (CSS) and a UE-specific Search Space (USS), which are constructed from PDCCHs or EPDCCHs as downlink control channels of all downlink subframes (or all downlink subframes configured during a DRX on period in a case of a DRX-set UE) and may acquire scheduling information on broadcast/multicast traffic, such as a System Information Block (SIB), a Random Access Response (RAR) and a paging message, and scheduling information on unicast traffic for the UE, which are transmitted in a corresponding cell. Accordingly, the UE is defined to receive broadcast/multicast messages and a unicast message through all downlink subframes.

Specifically, a CSS configuration method for transmitting scheduling information on broadcast/multicast messages for a random UE via a PDCCH or EPDCCH transmitted through a random downlink subframe and a USS configuration method for transmitting scheduling information on a unicast message are described in 3GPP TS 36.213.

Low-Complexity UE Category/Type for MCT Operation

As an LTE or LTE-Advanced network spreads, a mobile carrier wants to minimize the number of radio access terminals (RATs) in order to reduce network maintenance costs. Meanwhile, the number of MTC products has been increasing based on a typical GSM/GPRS network, and MTC UEs using a low data transmission rate may be provided at a low cost. Thus, when the LTE/LTE-advanced network is used for general data transmission and the GSM/GPRS network is used for MTC UEs, a mobile carrier needs to operate two separate RATs. This is an inefficient utilization of a frequency band, which is a problem in terms of efficiency and profit for the mobile carrier.

To solve the foregoing problems, an inexpensive MTC UE using the GSM/EGPRS network needs to be replaced with an MTC UE using the LTE/LTE-Advanced network, and accordingly various requirements for reducing the price of an LTE/LTE-Advanced MTC UE are under discussion. Further, various functions are researched to meet the discussed requirements. That is, there is raised a necessity of defining a low-complexity UE category/type considering various requirements for reducing the price of an LTE MTC UE.

Further, since about 20% of MTC UEs supporting an MTC service including smart metering are installed in a deep indoor environment (for example, in a basement), the coverage of an LTE MTC UE needs to be enhanced by about 15 dB for successful MTC data transmission as compared with the coverage of a typical LTE/LTE-Advanced UE. Moreover, further considering a performance decrease by the foregoing technique, the coverage of the LTE MTC UE needs to be enhanced by about 15 dB or greater.

To enhance the coverage of an LTE/LTE-Advanced MTC UE while reducing the price thereof, it is required to develop various techniques for robust transmission, such as PSD boosting, low coding rate, and time domain repetition.

Specifically, requirements for a low-complexity UE category/type for MTC operations are as follows.

Reduced UE bandwidth of 1.4 MHz in downlink and uplink.
  Bandwidth reduced UEs should be able to operate within any system bandwidth.
  Frequency multiplexing of bandwidth reduced UEs and non-MTC UEs should be supported.
  The UE only needs to support 1.4 MHz RF bandwidth in downlink and uplink.
Reduced maximum transmit power.
Reduced support for downlink transmission modes.
  Further UE processing relaxations
    Reduced maximum transport block size for unicast and/or broadcast signalling.
    Reduced support for simultaneous reception of multiple transmissions.
    Relaxed transmit and/or receive EVM requirement including restricted modulation scheme. Reduced physical control channel processing (e.g. reduced number of blind decoding attempts).
    Reduced physical data channel processing (e.g. relaxed downlink HARQ time line or reduced number of HARQ processes).
    Reduced support for CQI/CSI reporting modes.
  Target a relative LTE coverage improvement—corresponding to 15 dB for FDD—for the UE category/type defined above and other UEs operating delay tolerant MTC applications with respect to their respective nominal coverage.
  Provide power consumption reduction for the UE category/type defined above, both in normal coverage and enhanced coverage, to target ultra-long battery life.

In the present disclosure, a coverage-enhancement and low-complexity UE category/type that satisfies the foregoing requirements for MTC operations is simply referred to as an MTC UE for convenience of description. This term is for the convenience of understanding and is not provided for restriction.

[Physical Downlink Control/Data Channel for MTC]

In existing 3GPP LTE/LTE-Advanced Release-12 and earlier-version systems, a PDCCH and an EPDCCH are defined as downlink control channels for transmitting and receiving downlink control information (DCI). Particularly, in the Release-10 and earlier-version systems, a UE receives downlink control information through a PDCCH transmitted through first one to three OFDM symbols (two to four OFDM symbols in a system bandwidth of 1.4 MHz) of all downlink subframes.

In addition, in 3GPP LTE/LTE-Advanced Release-11, an EPDCCH is defined as a new downlink control channel. The EPDCCH enables a random UE for receiving downlink control information through a PDCCH or receives downlink control information through an EPDCCH according to a configuration of a base station.

In an LTE/LTE-Advanced system, reception of downlink control information is basically performed in a blind detection scheme in which a UE monitors a plurality of PDCCH candidates or EPDCCH candidates. To this end, a random LTE/LTE-Advanced UE is defined to monitor a CSS and a USS, which are constructed from a plurality of PDCCH candidates, through a PDCCH region or to monitor a USS that is constructed from a plurality of EPDCCH candidates through an EPDCCH region. Here, each PDCCH candidate or EPDCCH candidate may be constructed from an aggregation of control channel elements (CCEs) or enhanced control channel elements (ECCEs) as basic transmission units for a PDCCH and an EPDCCH. A search space (CSS and USS) is defined such that a random UE monitors PDCCH candidates or EPDCCH candidates having a plurality of different aggregation levels in order to apply link adaptation for the transmission and reception of downlink control information.

However, unlike an existing PDCCH/EPDCCH transmitted through a single downlink subframe, an M-PDCCH as a downlink control channel for an MTC UE newly defined in Release-13 needs repeated transmissions through a plurality of downlink subframes for coverage enhancement. Accordingly, for an M-PDCCH, a domain of a repeated transmission number R may be further added for link adaptation in addition to an existing aggregation level L (L={1,2,4,8,16, 32}, L={1,2,4,8} for PDCCH). That is, a random M-PDCCH candidate may be defined using an aggregation level L, which is defined as the number of CCEs (or M-CCEs) used for the transmission of a corresponding M-PDCCH in each single downlink subframe, and a set of repetition numbers R, which is defined as the number of downlink subframes used for repeated transmissions. That is, the random M-PDCCH candidate may be defined by {L, R}, and each MTC UE may monitor a plurality of M-PDCCH candidates having different Ls and Rs according to a coverage level.

Likewise, in transmitting and receiving a downlink data channel (PDSCH) for an MTC UE, a PDSCH for a random MTC UE may be repeatedly transmitted through a plurality of downlink subframes for coverage enhancement. To this end, a base station may set, for each MTC UE, a PDSCH repetition level set for designating a PDSCH repeated transmission number according to a coverage level of an MTC UE through UE-specific RRC signaling, and may dynamically signal a repetition level to be applied to the PDSCH through DCI including PDSCH assignment information. Here, the repetition level to be applied to the PDSCH may be determined according to a PDSCH repetition level to apply in the repetition level set.

In addition, a valid downlink subframe for the transmission and reception of a downlink radio channel or downlink radio signal for an MTC UE, such as an M-PDCCH and a PDSCH, may also be set to be cell-specific by the base station through MTC-SIB1 and may be broadcast to MTC UEs in a cell. That is, transmission of the foregoing M-PDCCH candidates or PDSCH may be performed through only a valid downlink subframe set through corresponding MTC-SIB1.

Transmission of System Information

FIG. 1 is a signal diagram illustrating an operation of transmitting system information.

System information includes a Master Information Block (hereinafter, MIB) and a plurality of System Information Blocks (hereinafter, SIBs).

A UE 100 may receive an MIB from a base station 110 (S101). For example, the MIB includes essential information and has a 40 ms period. The MIB is transmitted via subframe #0 of a radio frame of SFN mod 4=0 and is repeatedly transmitted via subframes #0 in other radio frames.

Subsequently, the UE 100 may receive SIB 1 from the base station 110 (S102). For example, SIB 1 has an 80 ms period and is repeatedly transmitted in an 80 ms period. That is, SIB 1 is transmitted via subframe #5 in a radio frame of SFN mod 8=0 and is repeatedly transmitted via subframe #5 in a radio frame of SFN mod 2=0.

The UE 100 may receive SIBs other than SIB 1 (S103). For example, SIB messages (for example, SIB 2, 3, 4, . . . ) other than SIB1 are transmitted via a system information (hereinafter, SI) message. Information on the mapping of each of the SIBs to an SI message is included in SIB 1. When the UE 100 receives SIB 1, the UE 100 recognizes when the other SIBs are transmitted. Each SIB may be included in at least one SI message. One SI message may include a plurality of SIBs having the same period. A plurality of SI messages may have the same period. An SI message may be transmitted within an SI window, and one SI message may be associated with an SI window. Only one SI message may be transmitted within one SI window. Repeated transmissions of an SI message may be freely performed within the SI window.

Modification of System Information

System information may be modified by an information modification decision of a base station or core network. Modification of system information may occur only in a specific radio frame. The network sets a modification period and broadcasts the same system information within the period. When the network modifies all or a part of the system information, the network notifies a UE of a modification during the current modification period and broadcasts modified system information in a next modification period. The UE, which is notified of a system information modification from the network, receives new modified system information immediately at the start of the next modification period.

Figure 2:
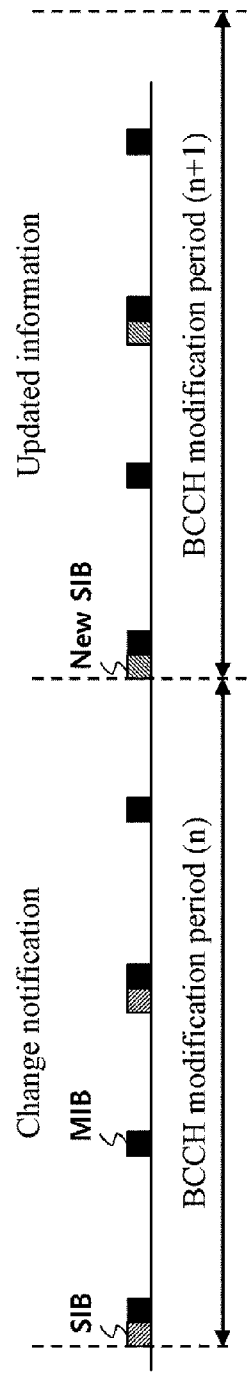
FIG. 2 is a diagram illustrating an operation of modifying system information.

FIG. 2 is a diagram illustrating an operation of modifying system information.

Referring to FIG. 2, a base station may notify a UE of a system information modification in modification period n and transmit modified system information in modification period n+1. That is, the UE may receive an SIB and an MIB in modification period n and may receive a new SIB as updated system information in modification period n+1. For convenience of description, FIG. 2 illustrates that SIB information is modified and transmission periods of the SIB and the MIB are set at random. A boundary for transmitting modified system information is defined by SFN mod m=0 and m is set in SIB 2.

Meanwhile, the base station may notify the UE of the system information modification through a paging message. If the UE receives a paging message including information on a system information modification (systemInfoModification), the UE may newly receive all system information immediately at the start of a next modification period. That is, even when some system information is modified, the UE may need to newly receive the entire system information and to apply the system information to the UE.

Meanwhile, SIB 1 may include a system information count value. The system information count value may be a value counted when SIBs are modified and may be included in a specific field of SIB1. For example, the system information count value may be included as a "systemInfoValueTag" Information Element (IE). When the network updates SIBs, a value of the "systemInfoValueTag" IE may be also updated, thereby allowing the UE to recognize through comparison of only the value whether SIBs are modified. For example, when the UE, which has been out of coverage, returns to coverage, the UE may compare the value of "systemInfoValueTag" of SIB 1 that is broadcast with a value that the UE has to identify whether SIBs that the UE has are valid (i.e., the same). The foregoing "systemInfoValueTag" value may not be updated when ETWS information, CMAS information, time information (for example, SIB 8 and SIB 16), and an EAB parameter are modified.

Random Access Procedure

Random access refers to a procedure used for a UE to synchronize in uplink time with a base station or to be allocated a radio resource.

A UE may perform a random access procedure in the following cases.

To perform an initial connection when a UE has no RRC connection with a base station.

To attempt re-establishment in radio connection failure or in handover failure.

When a UE initially connects to a target cell in a handover process.

When out of uplink-time synchronization or to request a radio resource (UL grant).

When requested by a base station.

The random access procedure is classified into a contention-based random access procedure and a non-contention-based or contention-free random access procedure. The two types of procedures are classified depending on whether a preamble (random access preamble) used in a random access procedure is selected directly by a UE or by a base station.

Figure 3:
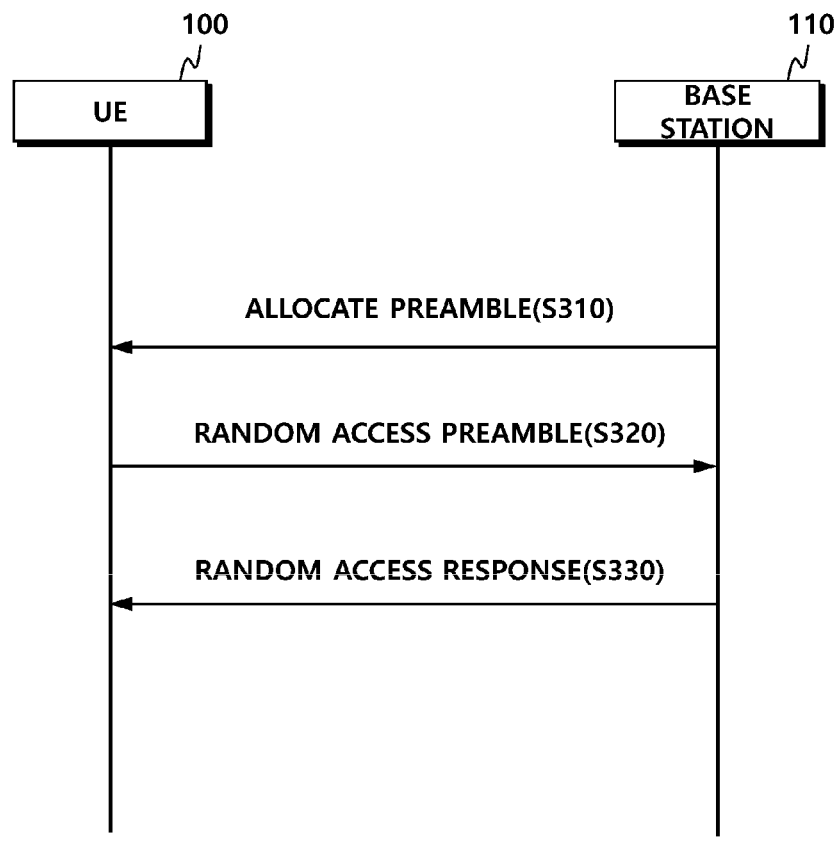
FIG. 3 is a diagram illustrating a contention-free random access procedure.

FIG. 3 is a diagram illustrating a contention-free random access procedure.

Referring to FIG. 3, in a non-contention-based (contention-free) random access procedure, a UE 100 may use a preamble that a base station 110 allocates only to the UE 100. That is, the base station 110 may allocate a preamble for each UE 100 to use in non-contention-based random access (S310). The preamble allocated to each UE 100 is unavailable for other UEs, thus causing no collision.

Subsequently, when the foregoing random access procedure is performed, the UE 100 may transmit a Random Access Preamble (RAP) to the base station 110 using the allocated preamble (S320). When the RAP is received, the base station 110 may transmit an RAR to the UE 100 (S330). When the RAR is received, the UE 100 may perform uplink-time synchronization using a Timing Advance Command (TAC) included in the RAR and prepare for uplink data transmission via a corresponding resource according to an uplink (UL) grant, thereby ending the random access procedure.

Figure 4:
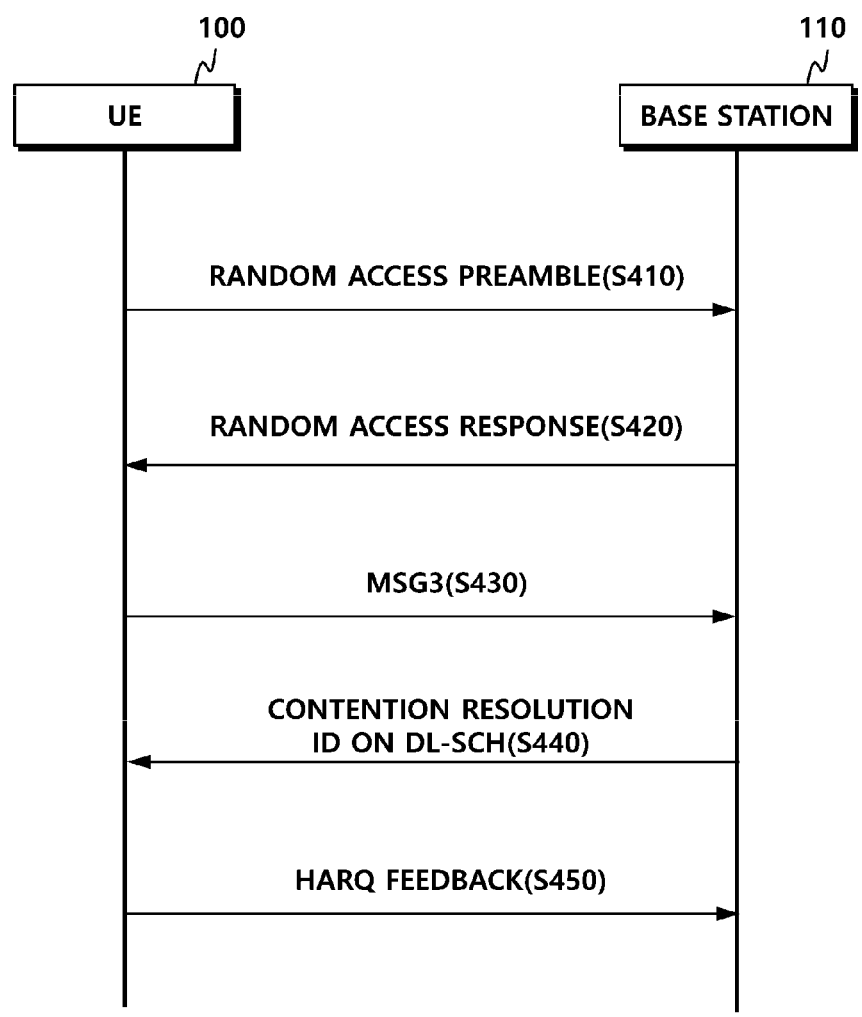
FIG. 4 is a diagram illustrating a contention-based random access procedure.

FIG. 4 is a diagram illustrating a contention-based random access procedure.

Referring to FIG. 4, in a contention-based random access procedure, a UE 100 may directly select a random preamble among available preambles and transmit the random preamble (S410). In this case, since the UE 100 selects the RAP at random, there is a possibility that the RAP may be selected and used simultaneously by a plurality of UEs. Therefore, when a base station 110 receives the RAP, the base station 110 may not recognize which UE the RAP is transmitted from. Thus, unlike the non-contention-based random access procedure, the contention-based random access procedure needs an additional process in which one UE is selected. Hereinafter, the contention-based random access procedure is described according to a sequence of FIG. 4.

1. First, the UE 100 may select one RAP at random from a set of RAPs set through received system information and transmit the RAP through a selected Physical Random Access Channel (PRACH) resource for transmitting the selected RAP (S410). A setting for the PRACH resource may be provided through the system information. A period on which the PRACH resource may be allocated and a subframe in which the PRACH resource is allocated may be identified through a PRACH configuration index of SIB 2.

2. The base station 110 may transmit a response message to one of received RAPs (S420). An RAR may be transmitted within an RAR window transmitted through the system information. The RAR message may include an RAP identifier (ID), an uplink radio resource (UL grant), a temporary Cell Radio Network Temporary Identifier (C-RNTI), an uplink time alignment command, and the like.

When the UE 100 receives an RAR to the transmitted RAP, the UE 100 may set information included in the RAR. For example, the UE 100 applies a TAC and sets the temporary C-RNTI included in the RAR message as a temporary C-RNTI of the UE 100. Subsequently, the UE 100 prepares to transmit a message through the received uplink radio resource. Here, other UEs, which have transmitted the same RAP through the same PRACH resource, also receive the RAR, apply the foregoing settings, and transmit Msg3.

3. The UE 100 may transmit Msg3 through the received radio resource using the received temporary C-RNTI (S430). Msg3 may include unique UE information, such as a UE ID.

4. The base station 110 may prepare a response message to one Msg3 that is received from the UE 100 and is successfully decoded. The base station 110 may configure Msg4 including a unique ID (contention resolution ID, UE ID) of the UE 100, which is included in Msg3, and transmit Msg4 using the temporary C-RNTI (S440).

5. When the response message (Msg4) is received, the UE 100 may compare the unique ID included in Msg 4 with the unique ID of the UE 100. If the unique IDs are the same, the UE 100 may determine that Msg4 is a response to Msg3, which the UE 100 has transmitted, and transmit an acknowledgement (ACK) to the base station 110 (S450). If the unique ID included in Msg 4 is different from the unique ID of the UE 100, the UE 100 may determine that the random access procedure failed and start a random access procedure over again.

According to the foregoing process, collisions between a plurality of UEs that transmit the same RAP through the same PRACH resource in the contention-based random access procedure may be avoided.

Random Access Preamble

Figure 5:
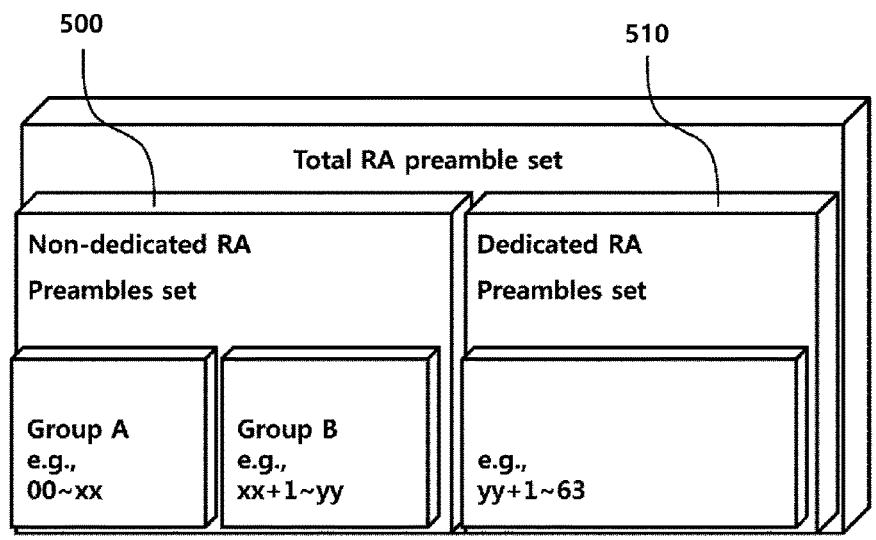
FIG. 5 is a diagram illustrating a random access preamble (RAP).

FIG. 5 is a diagram illustrating a random access preamble.

An RAP used in a random access procedure is briefly described with reference to FIG. 5.

An RAP may be divided into 64 in total. In overall, the RAP is divided into a non-dedicated Random Access (RA) preamble 500 and a dedicated RA preamble 510. The non-dedicated RA preamble 500 is a set of preambles available for a contention-based random access procedure. Further, the dedicated RA preamble 510 is a set of preambles available for a non-contention-based random access procedure. The non-dedicated RA preamble 500 is further divided into Group A and Group B. Group A and Group B are divided for classification according to the size of message 3 (Msg3) and path loss in a random access procedure. A base station divides and allocates in advance, through SIB 2, kinds and numbers of preambles for a UE to suitably use depending on a situation.

Random Access Response

Figure 6:
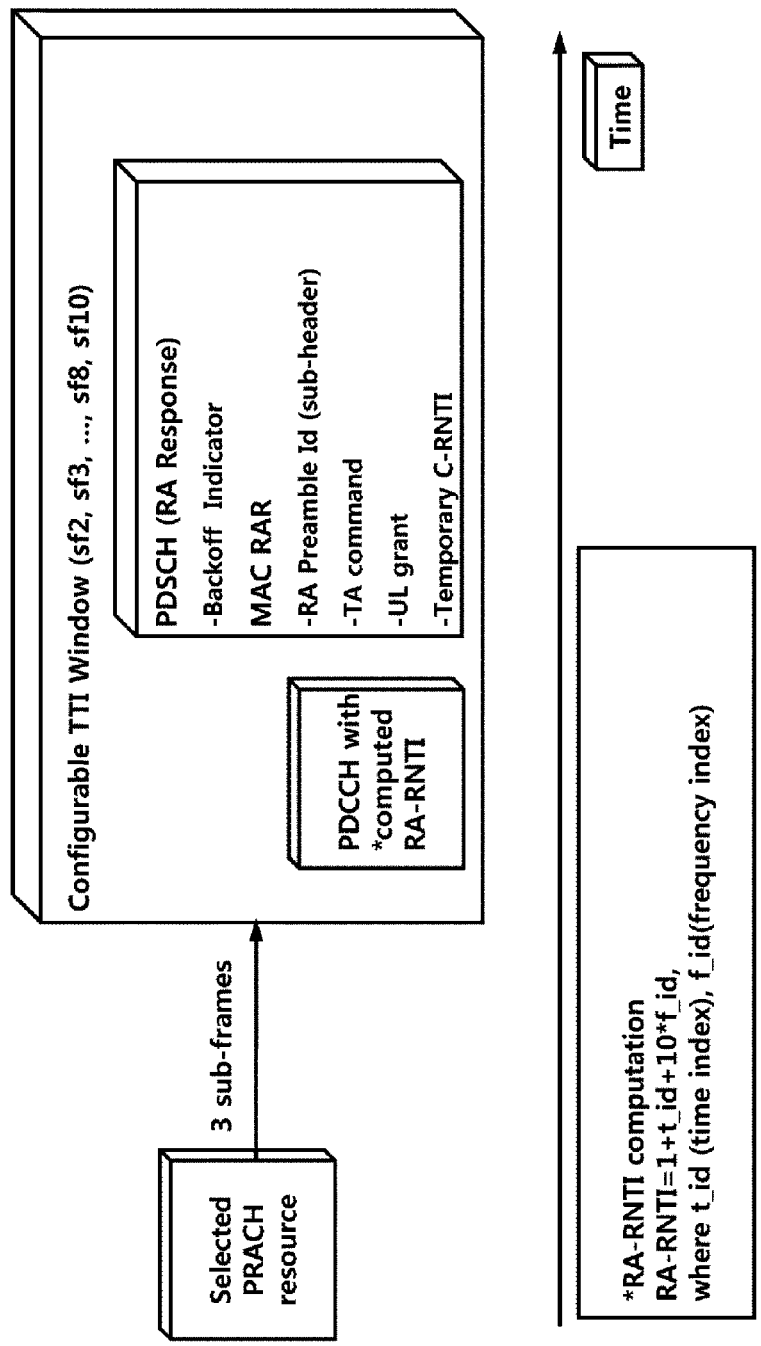
FIG. 6 is a diagram illustrating a random access response (RAR).

FIG. 6 is a diagram illustrating a random access response.

A UE, which has transmitted an RAP, may generate a Random Access RNTI (RA-RNTI) according to a PRACH resource used to transmit the RAP. The UE may monitor whether an RAR is received during an RAR window preset through SIB 2 after three subframes from the subframe used to transmit the RAP. Here, the UE may monitor using the RA-RNTI whether an RAR is received. When the UE receives an RAR message within the response window, the UE may adjust an uplink time synchronization according to a TAC included in the RAR message, set a temporary C-RNTI as an RNTI of the UE, and prepare to transmit Msg3, which is described above, according to an uplink grant using the set temporary C-RNTI.

MAC PDU for Random Access Response

Figure 7:
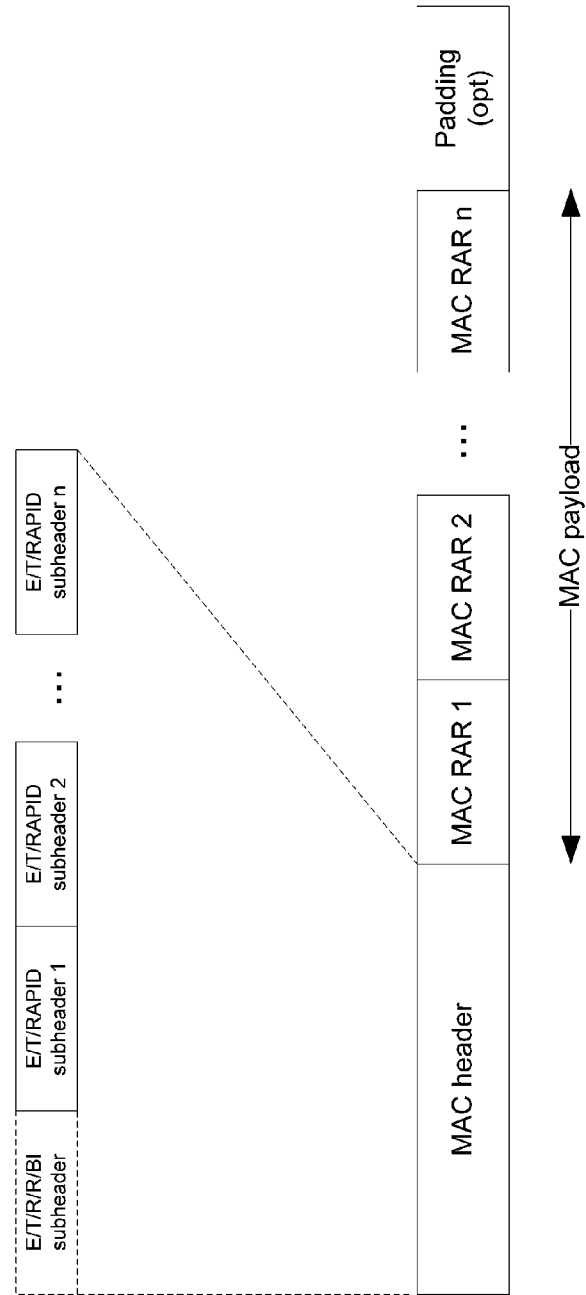
FIG. 7 is a diagram illustrating a Medium Access Control (MAC) Protocol Data Unit (PDU) including an RAR.

FIG. 7 is a diagram illustrating a Medium Access Control (MAC) Protocol Data Unit (PDU) including an RAR.

Referring to configuration information on an MAC PDU in FIG. 7, the PDU may include an MAC header and an MAC payload. Specifically, the MAC PDU may include one MAC header and zero or more MAC RARs, and may optionally include padding.

The MAC header is of variable size. An MAC PDU header may include one or more MAC PDU subheaders, and each subheader corresponds to an MAC RAR except for a backoff indicator subheader. If a backoff indicator subheader is included, only one backoff indicator subheader may be included and is a first subheader included in the MAC PDU header.

Figure 8:
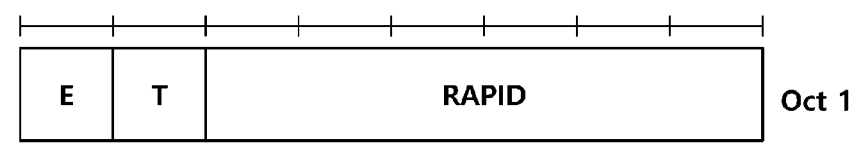
Figure 9:
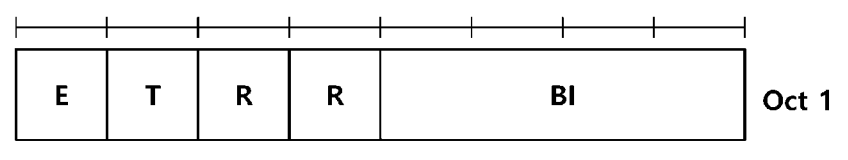

FIG. 8 is a diagram illustrating an E/T/RAPID MAC subheader, and FIG. 9 is a diagram illustrating an E/T/R/R/BI MAC subheader.

As illustrated in FIG. 8, an MAC PDU subheader includes three fields of E/T/RAPID. Meanwhile, as illustrated in FIG. 9, a backoff indicator subheader includes five subheaders of E/T/R/R/BI.

Figure 10:
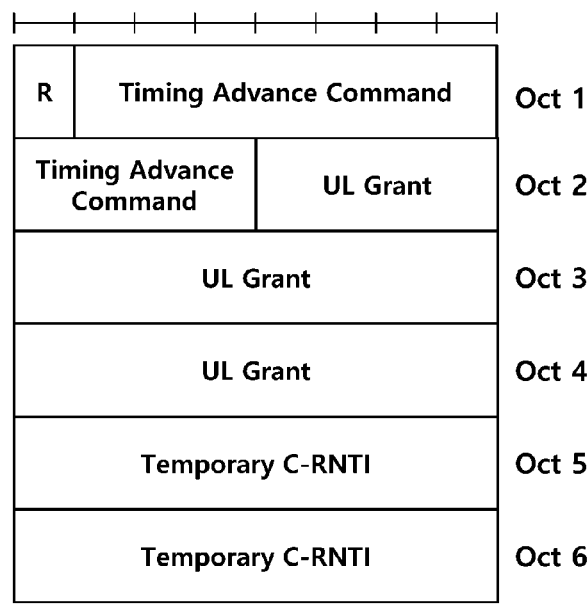
FIG. 10 is a diagram illustrating an MAC RAR.

FIG. 10 is a diagram illustrating an MAC RAR.

As illustrated in FIG. 10, an MAC RAR may include four fields of R/Timing Advance Command/UL Grant/Temporary C-RNTI.

Further, padding may occur after the last MAC RAR, and the presence and length of padding is implicit based on a TB size, an MAC header size, and the number of RARs.

As described above, an MTC UE may also receive the foregoing system information, may perform a modification procedure, and may perform a random access procedure, thereby transmitting/receiving data to/from a base station. Here, the MTC UE may need to consider coverage enhancement. Thus, the MTC UE may perform repeated transmissions in data transmission/reception to/from the base station. For example, a repeated transmission number of the MTC UE may be determined based on a repetition level and may be used along with an aggregation level when the MTC UE monitors a downlink signal.

However, repeated transmissions of uplink and downlink data by the MTC UE may cause the following problems in performing the foregoing random access procedure. Problems that may occur in the random access procedure of the MTC UE are described with reference to FIGS. 11 and 12. In the following description, for convenience, a preamble that an MTC UE transmits to a base station in a random access procedure is referred to as a preamble or RAP. Further, an operation of transmitting/receiving an RAP or RAR is referred to as RAP or RAR transmission/reception, or may be referred to as RAR message transmission/reception if necessary. That is, in the present specification, RAR transmission/reception is construed as indicating RAR message transmission/reception.

Figure 11:
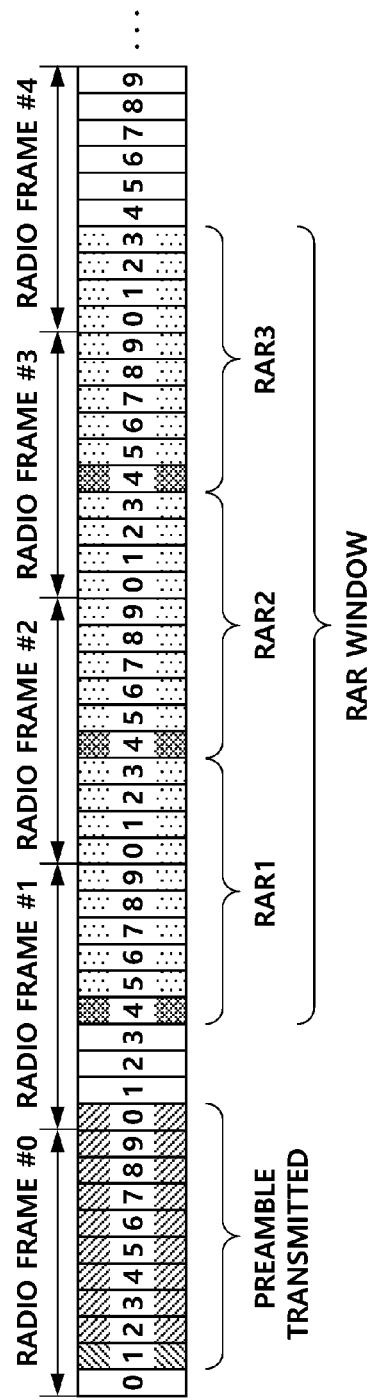
FIG. 11 is a diagram illustrating a problem in which the number of RARs transmitted within an RAR window is limited for a Machine-Type Communication (MTC) User Equipment (UE).

FIG. 11 is a diagram for describing a problem in which the number of RARs transmitted within an RAR window is limited for an MTC UE.

An RA-RNTI is generated according to a PRACH resource used to transmit an RAP, and an RAR is transmitted within a set RAR window. An MTC UE is restricted in message size and needs a large number of repeated transmissions. Accordingly, it is possible that a base station may not transmit an RAR to all UEs that have transmitted a preamble depending on the size of a set RAR window. Thus, random access may fail frequently.

Referring to FIG. 11, one RAR message may include a response to one or a plurality of preambles. As illustrated in FIG. 11, when an RAR window is set with a size for transmitting up to three RARs in view of an RAR repeated transmission number, since there are 64 preambles in total, one RAR message needs to include a response to at least 22 preambles. However, while the maximum size of a message for an MTC UE is restricted to 1000 bits or smaller, the size currently needed for a response to an RAP is 56 bits, and thus one RAR message is allowed to include only a response to up to 16 preambles. Further, since it is possible that the RAR for the MTC UE may include additional configuration information, the number of responses to RAPs that are allowed to be included in one RAR message may be reduced. Thus, the base station may not transmit a response to all RAPs transmitted from UEs at one time.

Figure 12:
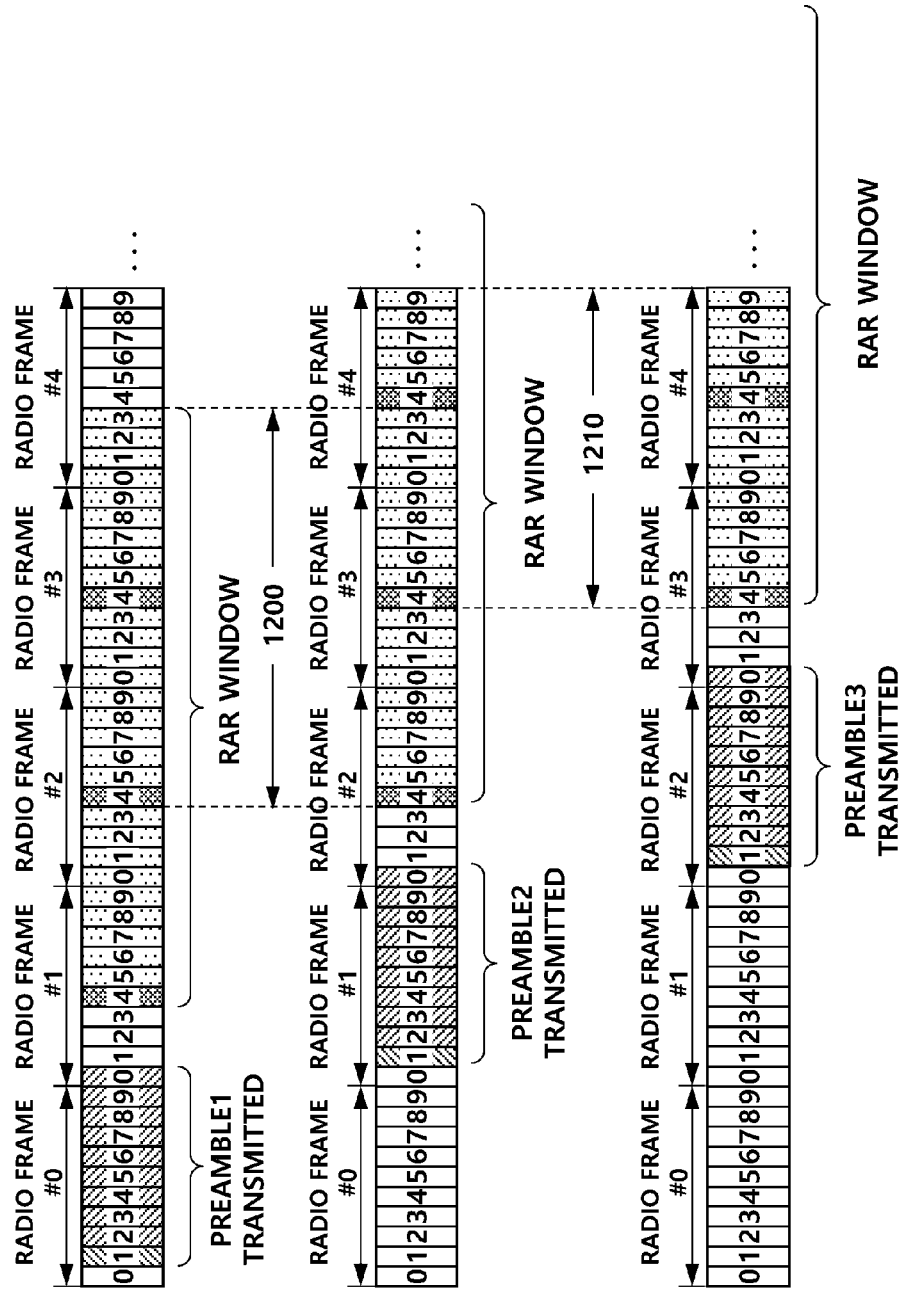
FIG. 12 is a diagram illustrating a collision between RARs for an MTC UE.

FIG. 12 is a diagram for describing collision between RARs for an MTC UE.

As described above, for an RAR, an RA-RNTI is generated according to a PRACH resource used to transmit a preamble, and it is monitored whether an RAR message is transmitted using the generated RA-RNTI within a set RAR window. Even MTC UEs that transmit RAPs using different PRACH resources may use the same RA-RNTI depending on a subframe number or frequency resource location in which a preamble is transmitted. Thus, since an RAR needs to be repeatedly transmitted for an MTC UE, UEs using the same RA-RNTI may have overlapping RAR windows although not transmitting preambles at the same time. That is, even MTC UEs that transmit preambles through different PRACH resources using the same RAP ID may happen to use the same RA-RNTI, may have collision between RARs due to overlapping RAR windows, and thus may fail in random access.

Referring to FIG. 12, when an RAP is set to be repeatedly transmitted ten times from subframe 1 of each radio frame and an RAR window is set to have a size such that up to three RARs, each of which is repeatedly transmitted ten times, are transmitted, with a space of three subframes from a subframe in which the transmission of the preamble is finished, overlapping portions 1200 and 1210 of RAR windows may occur as illustrated in FIG. 12. Specifically, an RAR window for an MTC UE transmitting preamble 1 overlaps with an RAR window for an MTC UE transmitting preamble 2 in a portion 1200, and the RAR window for the MTC UE transmitting preamble 2 overlaps with an RAR window for an MTC UE transmitting preamble 3 in a portion 1210. Likewise, the RAR window for the MTC UE transmitting preamble 1 may also overlap with the RAR window for the MTC UE transmitting preamble 3.

Since preambles 1 to 3 are transmitted via subframe 1 using the same frequency resource, the same RA-RNTI is determined. Thus, when preambles 1 to 3 have the same ID, it may not be determined which preamble, among preambles 1 to 3, a response to the preamble ID in the overlapping portions 1200 and 1210 of the RAR windows corresponds to. Thus, a collision occurs in the random access procedures, causing an increase in random access failure.

As described with reference to FIGS. 11 and 12, an MTC UE may not normally operate in receiving an RAR due to insufficient resources and collision. Hereinafter, a method and an apparatus for transmitting and receiving an RAR to solve the foregoing problems are described.

In accordance with embodiments, methods may be provided for solving a random access failure issue due to overlapping RA-RNTI using various methods of determining an RA-RNTI for receiving and distinguishing an RAR.

First Embodiment

An RA-RNTI may be determined in view of an RAP ID or RAP index that is selected to transmit an RAP. For example, the RA-RNTI may be determined using frequency index information on a PRACH used to transmit the RAP, subframe index information on the PRACH, and an RAP index. In this case, the RA-RNTI is determined additionally using the RAP ID or RAP index, thereby solving collision of RARs and insufficiency of RARs for an MTC UE.

Specifically, the RA-RNTI may be determined by Equation 1.

$$\text{RA-RNTI}=1+a*t\_id+b*f\_id+c*\text{preamble\_group\_id} \quad \text{[Equation 1]}$$

In Equation 1, t_id denotes time index information on a PRACH resource, and f_id denotes frequency index information on the PRACH resource. Further, preamble_group_id denotes an index indicating a group when RAPs are divided into k groups, which may be expressed as preamble index mod k=0 and may have a value of 0 to k−1. a, b, and c are natural numbers greater than 0, which may be set through an SIB or may be preset. k for calculating a preamble group index may be set through an SIB or may be preset.

Meanwhile, the foregoing method of determining the RA-RNTI may be assigned only within a typical RA-RNTI range (0001~003C). For example, the RA-RNTI may be determined by Equation 2 according to a duplex mode.

$$\text{RA-RNTI}=1+t\_id+(10*\text{preamble\_group\_id}), \text{ for FDD}$$

$$\text{RA-RNTI}=1+\text{preamble\_group\_id}+10*f\_id, \text{ for TDD} \quad \text{[Equation 2]}$$

For example, when there are six divided preamble groups, preamble_group_id may be 0 to 5 and preambles are classified in the six groups as in Table 1.

TABLE 1

| Preamble group | Preamble index |
|---|---|
| 0 | 0, 6, 12, 18, 24, 30, 36, 42, 48, 54, 60 |
| 1 | 1, 7, 13, 19, 25, 31, 37, 43, 49, 55, 61 |
| 2 | 2, 8, 14, 20, 26, 32, 38, 44, 50, 56, 62 |
| 3 | 3, 9, 15, 21, 27, 33, 39, 45, 51, 57, 63 |
| 4 | 4, 10, 16, 22, 28, 34, 40, 46, 52, 58 |
| 5 | 5, 11, 17, 23, 29, 35, 41, 47, 53, 59 |

In this case, the RA-RNTI ranges from 1 to 60, and MTC UEs have different RA-RNTIs depending on a frequency index of a PRACH used to start transmission of a preamble and a preamble index number. Each group has a different RA-RNTI according to Equations 1 and 2. An MTC UE starts to monitor an M-PDCCH for the MTC UE using a determined RA-RNTI during an RAR window.

As described above, in determining an RA-RNTI, RAP information is additionally used to solve the foregoing problems.

Second Embodiment

In a second embodiment, an MTC UE and a base station may additionally use radio frame information in determining an RA-RNTI.

Figure 13:
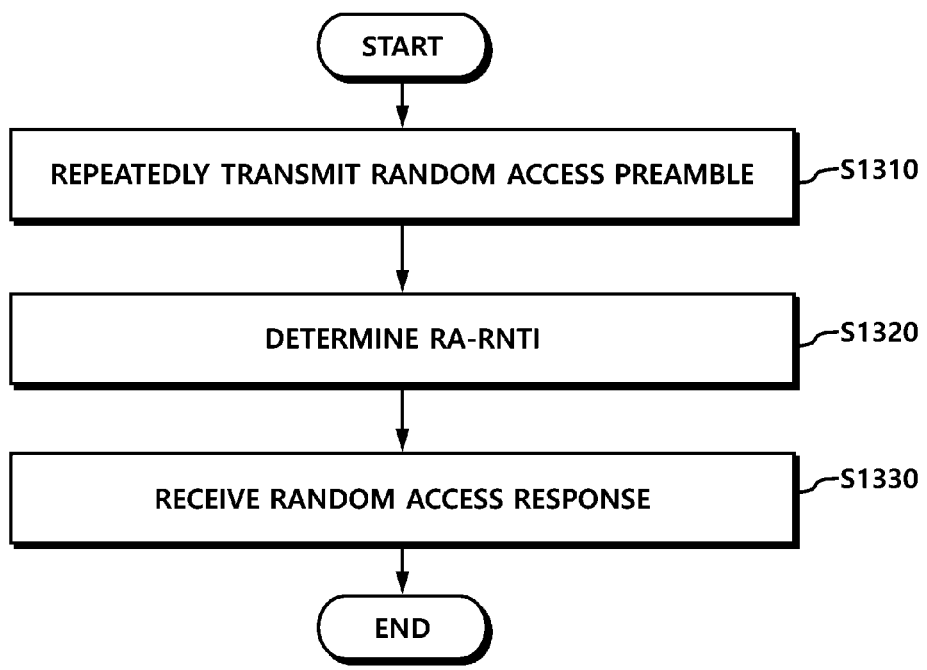
FIG. 13 is a diagram illustrating an operation of an MTC UE according to an embodiment.

FIG. 13 is a diagram illustrating an operation of an MTC UE according to an embodiment.

Referring to FIG. 13, an MTC UE may repeatedly transmit an RAP to a base station through a PRACH of at least one subframe (S1310). For example, the MTC UE transmits the RAP to the base station through the PRACH in order to perform a random access procedure. In this case, the MTC UE may repeatedly transmit the RAP via one or more subframes. Accordingly, the MTC UE has a coverage enhancement effect. That is, the MTC UE may repeatedly transmit the RAP to the base station using a PRACH resource in each of a plurality of successive subframes, in which an RAP may be selected according to contention-based or non-contention-based random access. A different preamble is selected according to contention-based random access or non-contention-based random access, which has been described above, and thus a description thereof is omitted.

Further, the MTC UE may determine an RA-RNTI using first time index information, frequency index information, and second time index information on the PRACH (S1320). For example, the MTC UE determines the RA-RNTI to receive an RAR to the RAP that the MTC UE has transmitted within an RAR window. In the second embodiment, the MTC UE may determine the RA-RNTI using the first time index information on the PRACH used to transmit the RAP, the frequency index information on the PRACH, and the second time index information on the PRACH. Here, the first time index information may include an index of a first subframe in which repeated transmissions of the RAP are started, and the frequency index information may include an index of a frequency resource of the PRACH used to transmit the RAP. For example, in an FDD duplex mode, the index of the frequency resource of the PRACH may be set to 0, and the first time index information may be an index number of the first subframe which includes the PRACH used for repeated transmissions of the RAP. For example, when the RAP is transmitted using a PRACH resource in subframe #1, the first time index information may be a subframe index, and the frequency index information may be an index (for example, 0) of a frequency resource of the PRACH resource in subframe #1.

Meanwhile, the second time index information may be determined based on an index of a first radio frame in which repeated transmissions of the RAP are started. For example, the MTC UE may additionally use a radio frame index in determining the RA-RNTI. Specifically, when the RAP is repeatedly transmitted through PRACH resources in 10 successive subframes from subframe #4 of radio frame #3, the first time index information is an index of subframe #4, the frequency index information is an index of a frequency resource of a PRACH resource in subframe #4, and the second time index information is determined based on an index of radio frame #3.

The second time index information may be determined based on a radio frame index according to various equations. For example, the second time index information may be determined by Equation 3.

$$\text{Second time index information} = \text{SFN mod } K \quad \text{[Equation 3]}$$

In Equation 3, SFN denotes an index of a radio frame that includes a PRACH in which repeated transmissions of an RAP are started, and K is a natural number. K may be set by a base station or may be stored in advance in an MTC UE. Alternatively, K may be determined based on the maximum size of an RAR window. For example, K may be determined to be a value of the maximum size of an RAR window divided by 10.

Meanwhile, the MTC UE may determine the RA-RNTI based on the sum of the first time index information, the frequency index information, and the second time index information. For example, the RA-RNTI may be determined by Equation 4.

$$\text{RA-RNTI} = 1 + t\_id + A * f\_id + B * t\_id2 \quad \text{[Equation 4]}$$

In Equation 4, t_id denotes first time index information, f_id denotes frequency index information, t_id2 denotes second time index information, and A and B denote preset constants. For example, A may be set to 10, and B may be set to 60. A and B may be stored in advance in an MTC UE or may be received via an SIB.

As necessary, the RA-RNTI, which is determined by Equation 4, may be determined only within a conventional RA-RNTI range (0001~003C). For example, the RA-RNTI may be determined by Equation 5.

$$\text{RA-RNTI} = 1 + t\_id2 + 10 * f\_id \quad \text{[Equation 5]}$$

For example, in t_id2=SFN mod K, when K is 10, t_id2 may be a value of 0 to 9, and the RA-RNTI may be determined in a range of 1 to 60. MTC UEs have different RA-RNTIs according to an index of a frequency resource of a PRACH used to start transmission of an RAP and an index of a radio frame.

The MTC UE may receive an RAR to the RAP using the RA-RNTI within an RAR window (S1330). For example, the MTC UE starts to monitor an M-PDCCH for the MTC UE during the RAR window using the RA-RNTI determined by the foregoing methods. Accordingly, the MTC UE may receive the RAR based on the distinguished RA-RNTI although having the RAR window overlapping with that of another MTC UE having transmitted a preamble using the same first time index information and frequency index information. That is, the MTC UE may determine the RA-RNTI further using index information on a first radio frame used for repeated transmissions of the RAP, thereby solving random access failure caused by an overlapping RAR window and a limited number of RARs due to repeated transmissions.

Third Embodiment

In accordance with a third embodiment, an RA-RNTI may be determined based on the combination of the first embodiment and the second embodiment.

In the third embodiment, the RA-RNTI may be determined in view of a radio frame in which transmission of an RAP is started and a preamble ID or preamble index selected for transmission of the preamble. That is, the RA-RNTI may be determined based on a PRACH frequency resource index, subframe index information, a radio frame, and a preamble ID or preamble index selected for transmission of the preamble. For example, the RA-RNTI may be determined by Equation 6.

$$\text{RA-RNTI} = 1 + a * t\_id + b * f\_id + c * \text{preamble\_group\_id} + d * t\_id2 \quad \text{[Equation 6]}$$

In Equation 6, preamble_group_id denotes an index indicating a group when RAPs are divided into j groups, which may be expressed as preamble index mod j=0 and may have a value of 0 to j−1. t_id2 is a value determined based on a radio frame in which a UE starts to transmit a preamble, which is obtained by an equation of SFN mod K and may be a value of 0 to k−1 according to a number of a radio frame in which transmission of a preamble is started. Further, a, b, c, and d may be constants that are set through an SIB or are preset. As described above, t_id and f_id denote an index of a subframe in which an RAP is transmitted and an index of a frequency resource of a PRACH, respectively. In addition, j for calculating a preamble group index and K for calculating t_id2 may be constants that are set through an SIB or are preset. The RA-RNTI may be assigned only within a conventional RA-RNTI range (0001~003C). For example, the RA-RNTI may also be determined by Equation 7.

$$\text{RA-RNTI}=1+\text{preamble\_group}\_id+10*t\_id2 \quad [\text{Equation 7}]$$

In Equation 7, when preamble_group_id is preamble index mod 10, preamble_group_id may be a value of 0 to 9; and when t_id2 is SFN mod 6, t_id2 may be a value of 0 to 5. In this case, the RA-RNTI ranges from 1 to 60, and MTC UEs have different RA-RNTIs depending on index information on a frequency used to start transmission of a preamble and a radio frame index. An MTC UE starts to monitor an M-PDCCH for the MTC UE using a determined RA-RNTI during an RAR window.

As described above, an RA-RNTI may be determined using time and frequency information on repeated transmissions of an RAP in a random access procedure of an MTC UE. Specifically, the RA-RNTI is determined using first time index information (for example, an index of a first subframe used for repeated transmissions of the RAP), frequency index information (for example, an index of a frequency of a PRACH used for repeated transmissions of the RAP), and second time index information (for example, a result of a modulo operation using an index of a first radio frame used for repeated transmissions of the RAP and K). Accordingly, the MTC UE may resolve problems of overlapping RARs and insufficient resources caused by repeated transmissions. Further, the MTC UE may reduce random access failure.

Hereinafter, an operation of a base station to perform the foregoing embodiments of the present disclosure is described with reference to FIG. 14.

Figure 14:
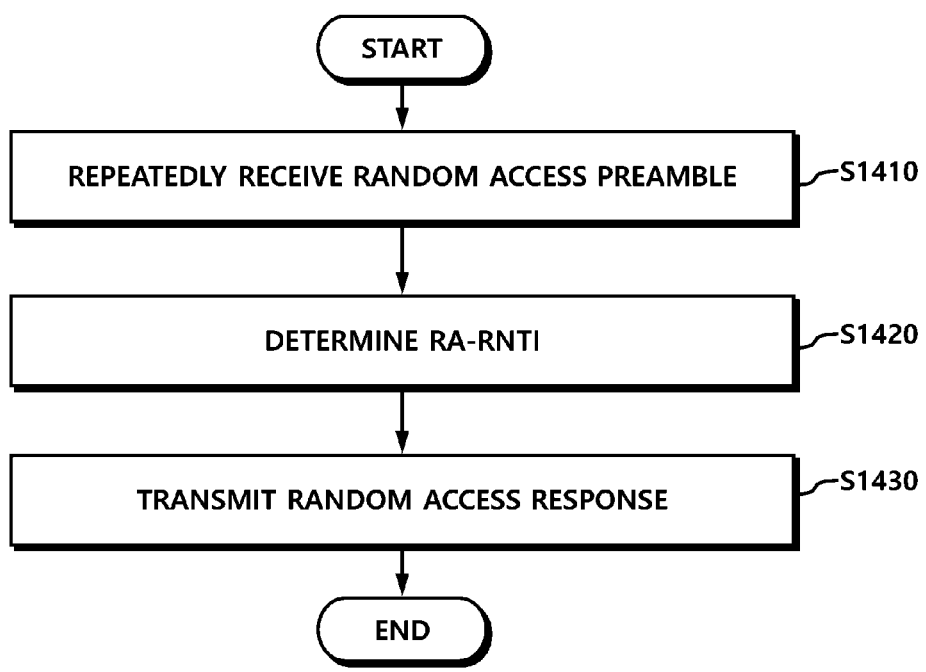
FIG. 14 is a diagram illustrating an operation of a base station according to an embodiment.

FIG. 14 is a diagram illustrating an operation of a base station according to an embodiment.

Referring to FIG. 14, a base station may repeatedly receive an RAP from an MTC UE through a PRACH of at least one subframe (S1410). For example, the base station may repeatedly receive the RAP from the MTC UE through one or more successive subframes. The RAP may be received through a PRACH of each subframe.

The base station may determine an RA-RNTI using first time index information, frequency index information, and second time index information on the PRACH (S1420). When the RAP is received from the MTC UE, the base station may determine the RA-RNTI using the first time index information on the PRACH used to transmit the RAP, the frequency index information on the PRACH, and the second time index information on the PRACH. As described in the second embodiment, the first time index information may include a subframe index of a first subframe in which repeated transmissions of the RAP are started, and the frequency index information may include an index of a frequency of the PRACH in which repeated transmissions of the RAP are started. Further, the second time index information may be determined using an index of a first radio frame in which repeated transmissions of the RAP are started. For example, the second time index information may be determined by a modulo operation using the index of the first radio frame and a preset constant K Specifically, the second time index information may be determined by Equation 3 in the second embodiment.

Further, the RA-RNTI may be determined by an equation using factors of the first time index information, the frequency index information, and the second time index information. For example, the RA-RNTI may be determined by Equation 4.

Subsequently, the base station may transmit an RAR to the RAP using the RA-RNTI within an RAR window (S1430). The base station may transmit the RAR using the determined RA-RNTI, and the MTC UE may receive the RAR to the RAP transmitted by the MTC UE using the RA-RNTI within the RAR window.

Configurations of an MTC UE and a base station to perform the embodiments of the present invention described with reference to FIGS. 1 to 14 are briefly described with reference to a drawing.

Figure 15:
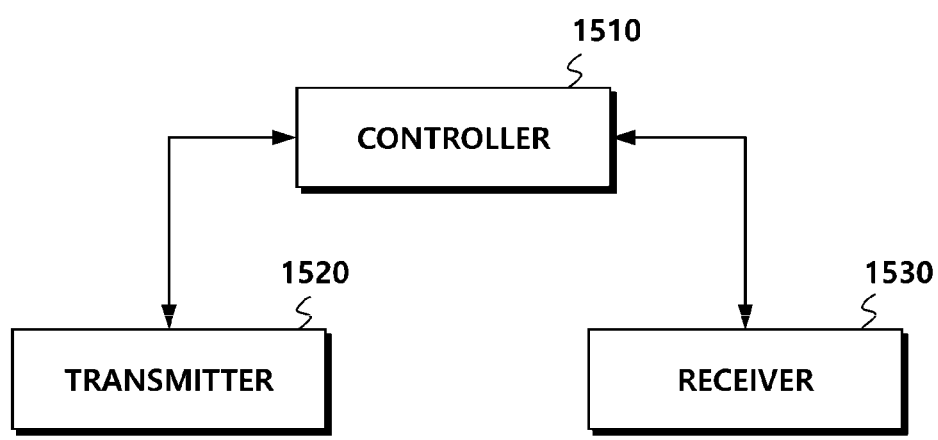
FIG. 15 is a diagram illustrating a configuration of an MTC UE according to an embodiment.

FIG. 15 is a diagram illustrating a configuration of an MTC UE according to an embodiment.

Referring to FIG. 15, an MTC UE 1500 that receives an RAR may include a transmitter 1520, a controller 1510, and a receiver 1530. The transmitter 1520 may repeatedly transmit an RAP to a base station through a PRACH of at least one subframe. The controller 1510 may determine an RA-RNTI using first time index information, frequency index information, and second time index information on the PRACH. The receiver 1530 may receive an RAR to the RAP using the RA-RNTI within an RAR window.

The controller 1510 may control both each operation for a random access procedure needed to achieve the foregoing embodiments of the present disclosure and a specific operation of determining the RA-RNTI. For example, the controller 1510 may determine the RA-RNTI using each of the methods according to the first to third embodiments.

The receiver 1530 may receive the RAR from the base station and may receive a constant needed to determine the RA-RNTI through an SIB or the like. In addition, the receiver 1530 may receive downlink control information, data, and messages from the base station through a corresponding channel.

The transmitter 1520 may transmit uplink control information, data, and messages to the base station through a corresponding channel.

Figure 16:
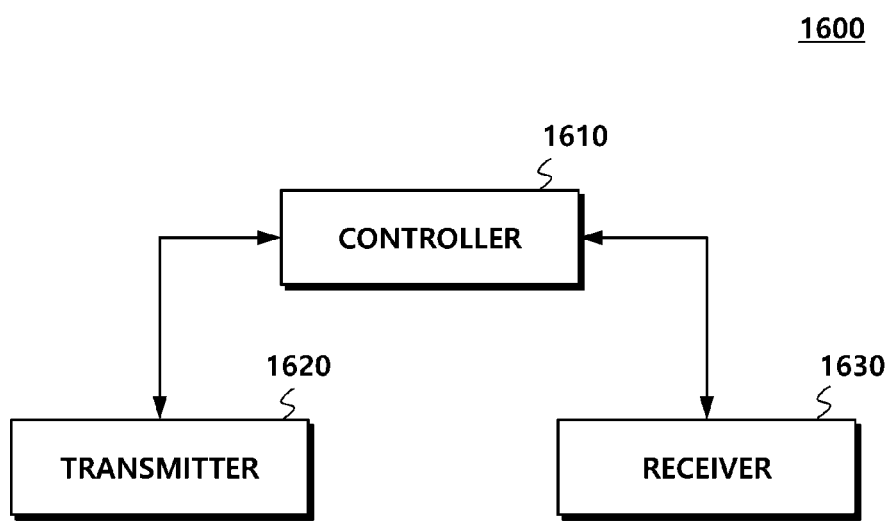
FIG. 16 is a diagram illustrating a configuration of a base station according to an embodiment.

FIG. 16 is a diagram illustrating a configuration of a base station according to an embodiment.

Referring to FIG. 16, a base station 1600 includes a receiver 1630, a controller 1610, and a transmitter 1620. The receiver 1630 may repeatedly receive an RAP from an MTC UE through a PRACH of at least one subframe. The controller 1610 may determine an RA-RNTI using first time index information, frequency index information, and second time index information on the PRACH. The transmitter 1620 may transmit an RAR to the RAP using the RA-RNTI within an RAR window.

The controller 1610 may control a random access procedure needed to achieve the foregoing present invention and control overall operations of the base station 1600 for determining the RA-RNTI.

In addition, the transmitter 1620 and the receiver 1630 may be used to transmit/receive a signal, a message, and data, which are needed to achieve the foregoing present invention, to/from the MTC UE.

Specifications and standards mentioned in the foregoing embodiments are omitted herein to simplify the description of the specification and constitute part of the present specification. Therefore, it should be understood that part of the specifications and standards can be added to the present specification or be specified in the claims within the scope of the present invention.

Although at least one preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of at least one embodiment of the present disclosure shall be construed on the basis of the accompanying claims in such a manner that all of the technical ideas included within the scope equivalent to the claims belong to the present disclosure.

What is claimed is:

1. A method of receiving a random access response by a Machine-Type Communication (MTC) user equipment (UE), the method comprising:
repeatedly transmitting a random access preamble to a base station through a Physical Random Access Channel (PRACH) of at least one subframe;
determining a Random Access Radio Network Temporary Identifier (RA-RNTI) using first time index information, frequency index information, and second time index information on the PRACH; and
receiving the random access response to the random access preamble using the RA-RNTI within a random access response window,
wherein the RA-RNTI is determined by an equation below, $$RA\text{-}RNTI=1+t\_id+10*f\_id+60*t\_id2,$$

where t_id is the first time index information, f_id is the frequency index information, and t_id2 is the second time index information.

2. The method of claim 1, wherein:
the first time index information comprises an index of a first subframe in which repeated transmissions of the random access preamble are started; and
the frequency index information comprises an index of a frequency resource of the PRACH.

3. The method of claim 1, wherein the second time index information is determined based on an index of a first radio frame in which repeated transmissions of the random access preamble are started.

4. The method of claim 3, wherein the second time index information is determined by an equation, $$Second\ time\ index\ information=SFN\ mod\ K,$$

where System Frame Number (SFN) is the index of the first radio frame, and K is a natural number.

5. A method of transmitting a random access response to a Machine-Type Communication (MTC) user equipment (UE) by a base station, the method comprising:
repeatedly receiving a random access preamble from the MTC UE through a Physical Random Access Channel (PRACH) of at least one subframe;
determining a Random Access Radio Network Temporary Identifier (RA-RNTI) using first time index information, frequency index information, and second time index information on the PRACH; and
transmitting the random access response to the random access preamble using the RA-RNTI within a random access response window,
wherein the RA-RNTI is determined by an equation below, $$RA\text{-}RNTI=1+t\_id+10*f\_id+60*t\_id2,$$

where $t_{13}$ id is the first time index information, f_id is the frequency index information, and t_id2 is the second time index information.

6. The method of claim 5, wherein:
the first time index information comprises an index of a first subframe in which repeated receptions of the random access preamble are started; and
the frequency index information comprises an index of a frequency resource of the PRACH.

7. The method of claim 5, wherein the second time index information is determined based on an index of a first radio frame in which repeated receptions of the random access preamble are started.

8. The method of claim 7, wherein the second time index information is $$Second\ time\ index\ information=SFN\ mod\ K,$$

where System Frame Number (SFN) is the index of the first radio frame, and K is a natural number.

9. A Machine-Type Communication (MTC) User Equipment (UE) for receiving a random access response, the MTC UE comprising:
a transmitter configured to repeatedly transmit a random access preamble to a base station through a Physical Random Access Channel (PRACH) of at least one subframe;
a controller configured to determine a Random Access Radio Network Temporary Identifier (RA-RNTI) using first time index information, frequency index information, and second time index information on the PRACH; and
a receiver configured to receive the random access response to the random access preamble using the RA-RNTI within a random access response window,
wherein the RA-RNTI is determined by an equation below, $$RA\text{-}RNTI=1+t\_id+10*f\_id+60*t\_id2,$$

where t_id is the first time index information, f_id is the frequency index information, and t_id2 is the second time index information.

10. The MTC UE of claim 9, wherein:
the first time index information comprises an index of a first subframe in which repeated transmissions of the random access preamble are started; and
the frequency index information comprises an index of a frequency resource of the PRACH.

11. The MTC UE of claim 9, wherein the second time index information is determined based on an index of a first radio frame in which repeated transmissions of the random access preamble are started.

12. The MTC UE of claim 11, wherein the second time index information is determined by an equation, $$Second\ time\ index\ information=SFN\ mod\ K,$$

where System Frame Number (SFN) is the index of the first radio frame, and K is a natural number.

* * * * *

UNITED STATES PATENT AND TRADEMARK OFFICE
CERTIFICATE OF CORRECTION

PATENT NO. : 10,039,132 B2
APPLICATION NO. : 15/260415
DATED : July 31, 2018
INVENTOR(S) : KyungJun Lee et al.

It is certified that error appears in the above-identified patent and that said Letters Patent is hereby corrected as shown below:

In the Claims

In Claim 5, Column 20, Line 7, "where t.sub.13 id" should be amended --where t_id--.

In Claim 8, Column 20, Line 21, "information is" should be amended --information is determined by an equation below,--.

Signed and Sealed this
Thirtieth Day of October, 2018

Andrei Iancu
*Director of the United States Patent and Trademark Office*